United States Patent
Kappes et al.

(10) Patent No.: US 7,826,472 B2
(45) Date of Patent: Nov. 2, 2010

(54) METHODS AND SYSTEMS FOR PROVIDING PRIORITY ACCESS TO 802.11 ENDPOINTS USING DCF PROTOCOL

(75) Inventors: Martin Kappes, Frankfurt (DE); Parameshwaran Krishnan, Basking Ridge, NJ (US); Anjur S. Krishnakumar, Rocky Hill, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1606 days.

(21) Appl. No.: 11/062,262

(22) Filed: Feb. 18, 2005

(65) Prior Publication Data
US 2006/0187952 A1 Aug. 24, 2006

(51) Int. Cl.
*H04L 12/413* (2006.01)
*H04J 3/02* (2006.01)

(52) U.S. Cl. .................................. 370/445; 370/462

(58) Field of Classification Search ............... 370/209, 370/351, 447, 465, 338, 445, 349, 448, 347, 370/329, 252, 230; 455/452.1; 709/232, 709/222
See application file for complete search history.

(56) References Cited

U.S. PATENT DOCUMENTS

| | | | |
|---|---|---|---|
| 6,404,732 B1* | 6/2002 | van Nee | 370/209 |
| 6,813,260 B1* | 11/2004 | Fogle | 370/338 |
| 6,965,942 B1* | 11/2005 | Young et al. | 709/232 |
| 7,027,462 B2* | 4/2006 | Benveniste | 370/447 |
| 7,054,640 B2* | 5/2006 | Bing et al. | 455/452.1 |
| 7,095,754 B2* | 8/2006 | Benveniste | 370/465 |
| 7,233,603 B2* | 6/2007 | Lee | 370/445 |
| 7,266,085 B2* | 9/2007 | Stine | 370/252 |
| 7,272,119 B2* | 9/2007 | Rudnick et al. | 370/329 |
| 7,280,517 B2* | 10/2007 | Benveniste | 370/338 |
| 2002/0075844 A1* | 6/2002 | Hagen | 370/351 |
| 2002/0154653 A1* | 10/2002 | Benveniste | 370/447 |
| 2002/0163933 A1* | 11/2002 | Benveniste | 370/465 |
| 2002/0184389 A1 | 12/2002 | Sherman | |
| 2002/0191573 A1* | 12/2002 | Whitehill et al. | 370/338 |
| 2003/0033394 A1* | 2/2003 | Stine | 709/222 |
| 2003/0103521 A1* | 6/2003 | Raphaeli et al. | 370/445 |
| 2004/0071154 A1* | 4/2004 | Wentink | 370/448 |

(Continued)

OTHER PUBLICATIONS

M. Kappes, A.S. Krishnakumar, P. Krishman, "MEOW with CATS: Multimedia Extensions over Wireless with CTS-Assisted Transmission Scheme", Wireless Communications and Networking Conference, IEEE, vol. 1, pp. 145-150, Mar. 2005, entire document.*

(Continued)

*Primary Examiner*—Gregory B Sefcheck
*Assistant Examiner*—Suk Jin Kang
(74) *Attorney, Agent, or Firm*—Cohen Pontani Lieberman & Pavane LLP (57) ABSTRACT

A method for providing priority access to 802.11 endpoints. The method includes the steps of sending a Clear To Send (CTS) frame from a designated station, without requiring a Request to Send (RTS) frame from a first station. The CTS frame includes a field identifying the first station for commencing transmission, and a field indicating a duration of transmission. A deferring step is also performed for deferring any transmissions of stations other than the first station until after the duration indicated in the CTS frame has passed.

27 Claims, 6 Drawing Sheets

U.S. PATENT DOCUMENTS

| | | | |
|---|---|---|---|
| 2004/0151144 A1* | 8/2004 | Benveniste | 370/336 |
| 2004/0156351 A1* | 8/2004 | Kim | 370/349 |
| 2004/0184475 A1* | 9/2004 | Meier | 370/449 |
| 2004/0196812 A1 | 10/2004 | Barber | |
| 2004/0196864 A1* | 10/2004 | Benveniste | 370/462 |
| 2005/0025176 A1* | 2/2005 | Ko et al. | 370/448 |
| 2005/0036475 A1* | 2/2005 | Nishiyama et al. | 370/347 |
| 2005/0157747 A1* | 7/2005 | Yang et al. | 370/465 |
| 2005/0190784 A1* | 9/2005 | Stine | 370/445 |
| 2006/0050742 A1* | 3/2006 | Grandhi et al. | 370/506 |
| 2006/0176813 A1* | 8/2006 | Santhanankrishnan | 370/230 |
| 2006/0209771 A1* | 9/2006 | Shpak | 370/338 |
| 2007/0032219 A1* | 2/2007 | Rudolf et al. | 455/404.1 |

OTHER PUBLICATIONS

Deng D-J et al., "A Priority Scheme for IEEE 802.11 DCF Access Method", IEICE Transactions on Communications, Communications Society, Tokyo, JP, vol. E82-B, No. 1, Jan. 1999, pp. 96-102, XP000927880, ISSN: 0916-8516.

* cited by examiner

Variation of $g(\omega)$ with jitter window $\omega$ for the *fixed* and *wavuni* techniques.

FIG. 6

METHODS AND SYSTEMS FOR PROVIDING PRIORITY ACCESS TO 802.11 ENDPOINTS USING DCF PROTOCOL

BACKGROUND OF THE INVENTION

1. Field of the Invention

The present disclosure relates to wireless communications and networking. More particularly, the present disclosure pertains to an overlay using Distributed Coordination Function (DCF) protocol for providing priority access to emergency calls.

2. Description of the Related Art

With the drafting of IEEE 802.11e standard for Quality of Service (QoS) approaching its finalization phase, issues regarding the deployment of 802.11e equipment into existing network environments with non-802.11e (legacy) equipment come to the fore. In existing non-802.11e networks (legacy networks), all terminals are treated equally with respect to gaining access to wireless channels. The IEEE 802.11e draft standard allows preferential channel allocation for traffic with QoS requirements such as multimedia streams. This preferential channel allocation is achieved through new variants for medium access control (MAC), namely extended distributed coordination function (eDCF) and the hybrid coordination function (HCF). The IEEE 802.11e specification will provide QoS enhancement at the medium access control (MAC) layer that allows WLAN systems to efficiently stream audio and video data.

802.11 WLAN is based on a cellular architecture where a system is divided into cells. Each cell is called a Basic Service Set (BSS), and is controlled by a base station called an Access Point (AP). Before transmitting frames, a station, such as a terminal device including, for example, mobile phones, PDAs, etc., must first gain access to the medium, which is a radio channel that is shared by all the stations. The 802.11 standard defines two forms of medium access, (1) distributed coordination function (DCF), and (2) point coordination function (PCF). DCF is mandatory and based on the CSMA/CA (carrier sense multiple access with collision avoidance) protocol. With DCF, 802.11 stations contend for access and attempt to send frames when there is no other station transmitting. If another station is sending a frame, stations will wait until the channel is free. The DCF and the PCF coexist and operate concurrently within a BSS. DCF may be used for Best Effort traffic delivery and PCF may be used for Real Time traffic delivery.

Figure 1:
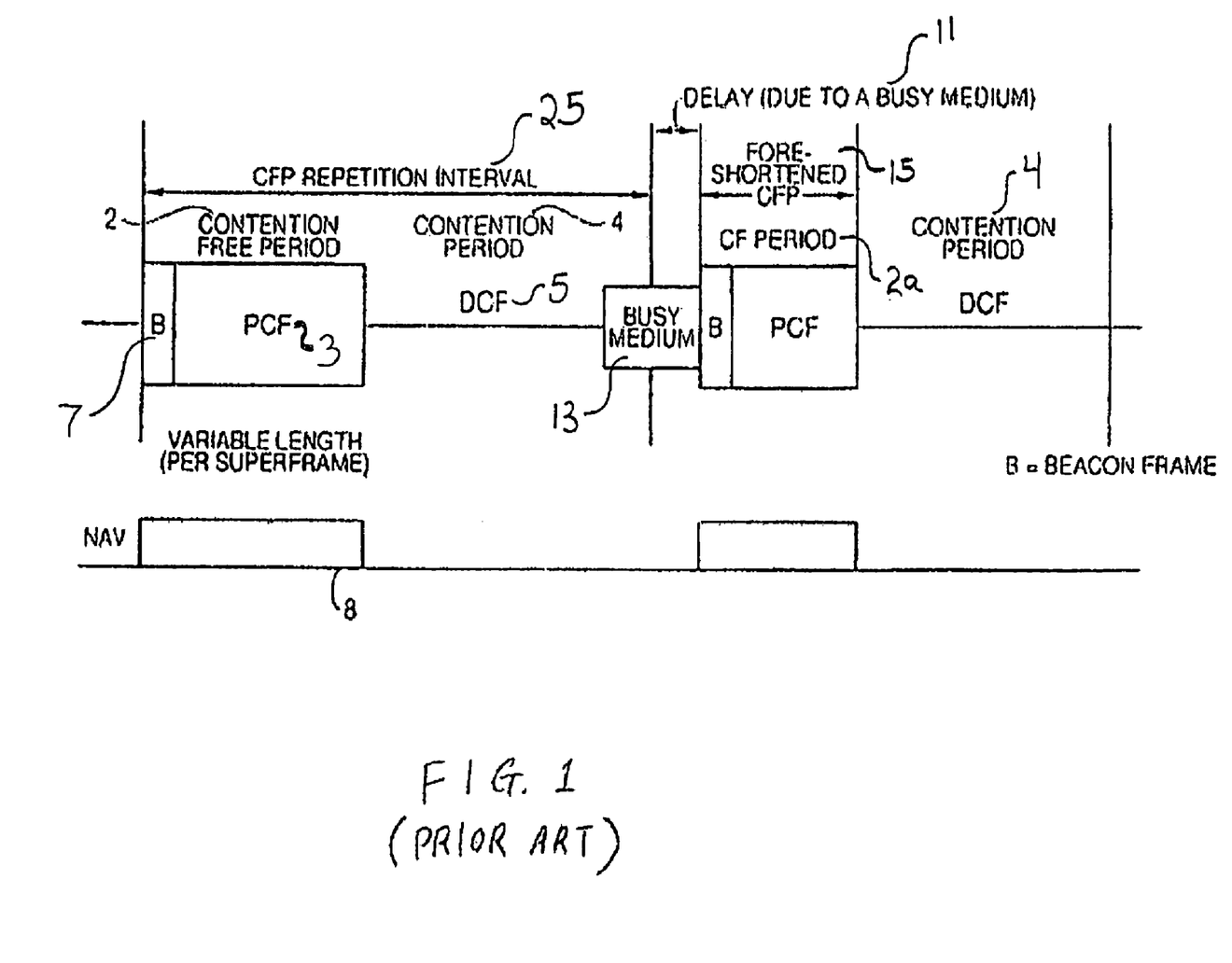
FIG. 1 illustrates a timing diagram of exemplary DCF/PCF periods.

FIG. 1 is a timing diagram of exemplary PCF (3)/DCF (5) periods. When a point coordinator (PC) is operating in a BSS, the two access methods (DCF and PCF) alternate, with a contention-free period (CFP) 2 followed by a contention period (CP) 4 and so on occur during a CFP repetition interval 25; these periods may be dynamically adjusted on the basis of the amount of polled terminals. Each terminal that has indicated the willingness to be polled, is polled once per CFP2. A network allocation vector (NAV) 8 extends the message duration and alerts others in the medium to back off on attempting to gain access to the medium for the duration of the transmission. A beacon frame (13) 7 is transmitted before each PCF (3). A delay 11 is shown. Delay 11 is due to the medium being busy 13. After a delay 11, the subsequent CFP 2a is shortened 15.

An important aspect of the DCF 5 is a random back-off timer that a station uses when it detects a busy medium 13. If the channel is in use, the station must wait a random period of time before attempting to access the medium again. This process ensures that multiple stations wanting to send data do not transmit at the same time. The random delay causes stations to wait different periods of time and avoids all of them sensing the medium at exactly the same time, finding the channel idle, transmitting, and colliding with each other. The back-off timer significantly reduces the number of collisions and corresponding retransmissions, especially when the number of active users increases.

With radio-based LANs, a transmitting station cannot listen for collisions while sending data, mainly because the station cannot have its receiver on while transmitting the frame. As a result, the receiving station needs to send an acknowledgement (ACK) if it detects no errors in the received frame. If the sending station does not receive an ACK after a specified period of time, the sending station will assume that there was a collision (or RF interference) and retransmit the frame.

In summary, in a DCF access method, which is based on 'listen before talk' technology, a wireless station waits for a quiet period on the network before transmitting data and detecting any collisions. On the other hand, PCF access method goes a step further as it supports time sensitive traffic and it splits the time into contention-free and contention periods and transmits data during the former. Although these two modes offer coordination and time sensitivity, neither distinguishes between different types of traffic.

Figure 2:
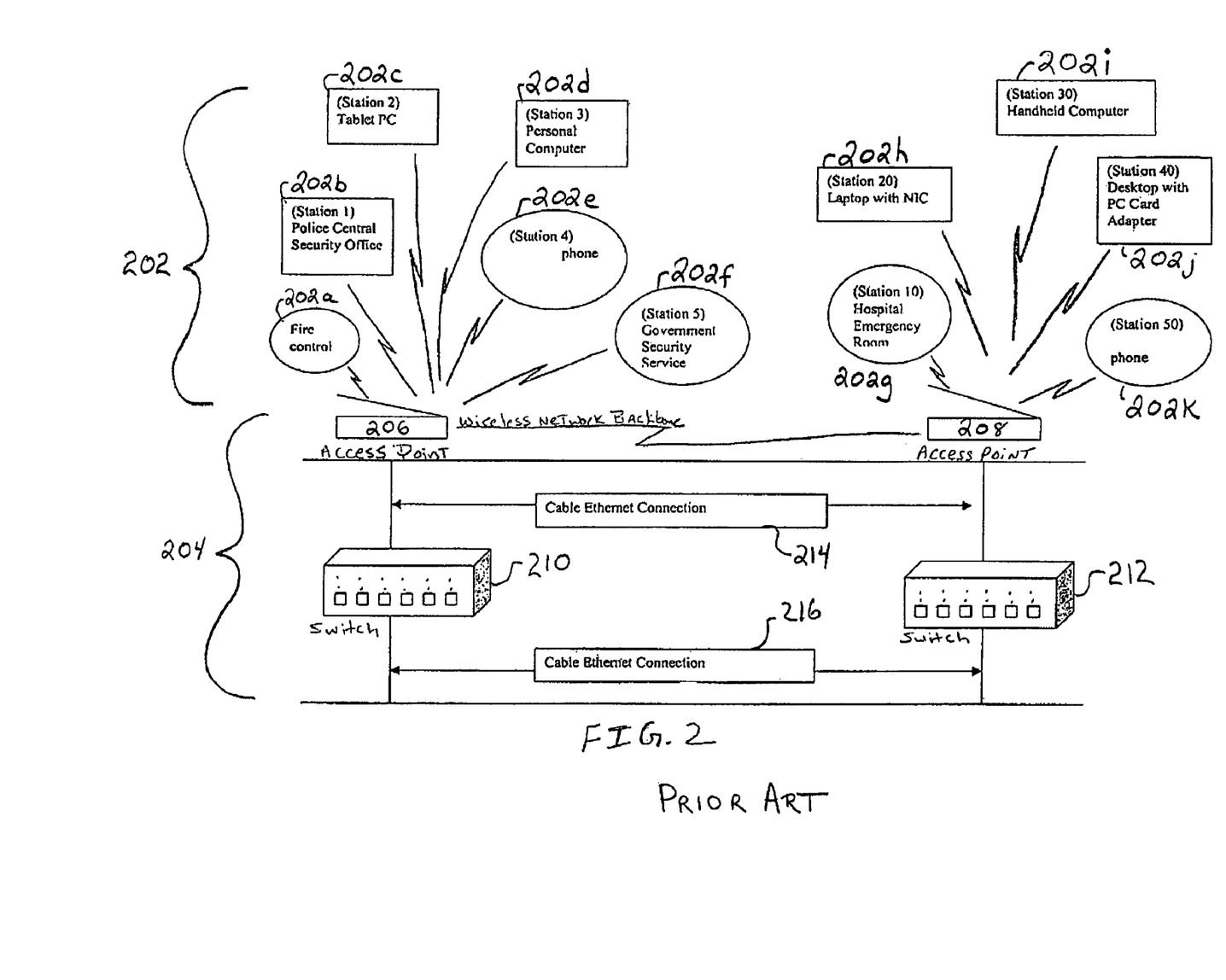
FIG. 2 illustrates an architectural model for a typical wired and wireless network infrastructure.

FIG. 2 shows an 802.11 protocol architectural structure for a typical wired network 20 and wireless network 202 including various types or sources of traffic 202a-202k. The 802.11 standard specifies a common medium access control (MAC) Layer, which provides a variety of functions that support the operation of 802.11-based wireless LANs. In general, the MAC Layer manages and maintains communications between 802.11 stations (radio network cards 202a-202k and access points 206, 208 by coordinating access to a shared radio channel and utilizing protocols that enhance communications over a wireless medium. Often viewed as the "brains" of the network, the 802.11 MAC Layer uses an 802.11 Physical (PHY) Layer, such as 802.11b or 802.11a, to perform the tasks of carrier sensing, transmitting, and receiving of 802.11 frames. The primary 802.11 MAC layer functions are scanning, authentication, association, WEP, RTS/CTS, power save mode and fragmentation. The wired network 204 comprises at least switches 210, 212, cables 214, 216, and the like.

As a condition to gain access to the medium, the 802.11 MAC Layer checks the value of its network allocation vector (NAV), which is a counter resident at each station that represents the amount of time that the previous station needs to send its frame. The NAV must be zero before a station can attempt to send a frame. Prior to transmitting a frame, a station calculates the amount of time necessary to send the frame based on the frame length and data rate. The station places a value representing this time in the duration field in the header of the frame. When stations receive the frame, they examine this duration field value and use it as the basis for setting their corresponding NAVs. Accordingly, the medium is reserved for the sending station by this process. However, the original 802.11 MAC protocol for wireless fidelity (Wi-Fi) does not support differentiation of different traffic types or sources, making it unsuitable for applications where certain traffic needs to be prioritized—such as voice or video over IP.

The implementation of the 802.11e standard will enhance both of the two modes of communications in the current state of 802.11 equipment. 802.11e defines a superset of features specified in the 1999 edition of IEEE 802.11. These enhancements distinguish QoS stations (QSTAs) from non-QoS STAs (STAs), and QoS access points (QAP) from non-QoS access points (AP). These features are collectively termed QoS facility.

When 802.11 e terminals are enabled in the presence of non-802.11 e (legacy) terminals, the QoS for non-802.11e (legacy) terminals will, in general, degrade. This is because the non-802.11e terminals are only able to send traffic in the best effort category which defers to higher priority access categories. This holds true even if the traffic from a non-802.11 e terminal is of high priority or has QoS requirements. Consequently, the QoS of Voice over IP (VoIP) calls from non-802.11e terminals tends to degrade in the presence of 802.11 e-capable equipment.

While the approach of providing only degraded best-effort service to non-802.11 e-compliant stations might be considered appropriate from an engineering standpoint, it poses many problems from business perspectives and also with respect to future governmental and regulatory requirements. Typically, technological advances are adopted gradually by enterprises, leading to a mix of equipment adhering to new and old technology standards. Consequently, the interoperability of such terminals is an important issue when deciding on the economic feasibilities of technological upgrade. Moreover, future governmental and regulatory requirements might require preferential channel access to any endpoint, such as endpoints running a VoIP connection in emergency situations. Legislatures worldwide have taken up the issues involved in migrating from traditional telephony networks to VoIP-based infrastructure, in particular with respect to emergency calls. For instance, the United States of America is working on the so-called extended 911 (E911) initiative regulating requirements for emergency calls in VoIP networks. It is to be expected that some countries will impose stringent rules requiring that emergency calls must gain preferential channel access in any type of deployment.

Unfortunately, since the existing WLANS, such as currently specified by IEEE P802.11/1999, do not support QoS transport and operate on a DCF or PCF basis, the quality degradation for non-802.11e endpoints when changing to 802.11e could require a complete upgrade to 802.11e for all stations using VoIP, potentially delaying the adoption of 802.11e in many enterprises. Further, 802.11e significantly increases the complexity of the original 802.11 MAC architecture. Most of the changes in the MAC architecture are logical consequences of introducing HCF with two new channel access functions: EDCA and HCCA. Upgrading from the original 802.11 MAC to 802.11e MAC requires extensive changes to existing functional blocks as well as adding new ones.

Further, implementation of 802.11e requires significant increases in memory, particularly RAM. The amount of additional RAM is a function of the increase in the number of transmission queues. In non-802.11e equipment, there are three queues: broadcast, multicast, and unicast. In 802.11e equipment, there are at least five: broadcast & multicast, and four access categories (AC). If hybrid coordination function (HCF) controlled channel access (HCCA) is also implemented, the number of additional queues for traffic streams varies between 1 to 8 for a QoS enhanced station (QSTA), and 1 to any number for a QoS enhanced access point (QAP) limited by available memory. Obviously, these queues and the associated buffers could be optimized to reduce the amount of RAM memory required, but the increase is still significant. This also depends on the existing software architecture of the MAC and the operating systems.

In addition, real-time constraints have become a lot tighter in 802.11e-enabled equipment. This is mainly due to the MAC level acknowledgement becoming optional. This challenge can either be overcome by a faster processor or by dedicated hardware logic; the latter being the preferred solution although expensive. The chosen approach will most likely be a compromise between performance, cost, and time-to-market.

A need therefore exists for the provision of QoS to support non-802.11e terminals with the advent of the 802.11e QoS standard. Particularly, regulatory and legislative bodies in certain countries in the near future will require preferential channel access for certain type of calls that need to be afforded with preferential treatment, such as emergency calls.

SUMMARY OF THE INVENTION

The present disclosure is directed to 802.11 endpoints using distributed coordination function (DCF) protocol that provides priority access to non-802.11e endpoints without requiring any client modifications. The present disclosure can be used to provide preferential channel access to non-802.11e endpoints in legacy networks (i.e., 802.11 networks that only have non-802.11e equipment), thus allowing the use of non-802.11e equipment to comply with regulatory requirements for providing priority access for emergency calls. The exemplary embodiments of the present invention can also be implemented in hybrid networks (i.e., 802.11 networks that have both 802.11e and non-802.11e equipment) using Enhanced Distributed Coordination Access (EDCA) having a notion of "traffic classes" and different traffic classes using different queues and back-off timers. In this case, higher priority traffic seizes a wireless medium quickly and transmits at the expense of lower priority traffic (e.g., non-802.11e endpoints). However, the various embodiments of the present disclosure provide an opportunity for the non-802.11e enabled endpoints to access the wireless medium with priority when the traffic sent from a non-802.11e endpoint is an emergency call, for example. Thus, a hybrid network can provide preferential channel access to non-802.11e endpoints even in the presence of the 802.11 e-enabled endpoints.

According to one exemplary embodiment of the present invention, a method of providing priority access to non-802.11e endpoints in an 802.11 legacy network and an 802.11e/non-802.11e hybrid network functions by positioning a reserved, unoccupied time slot or "quiet window" straddling the expected time when a protected end-point becomes ready to transmit. The method uses Clear-To-Send (CTS) frame technique to protect VoIP calls from non-802.11e equipment, and in particular, emergency calls in an 802.11e/non-802.11e hybrid environment. In detail, the method for providing priority access to 802.11 endpoints includes a first step of sending a Clear To Send (CTS) frame from a designated station without requiring a Request to Send (RTS) frame from a first station, wherein the CTS frame includes a field identifying the first station for commencing transmission and a field indicating a duration, and a second step of deferring any transmissions of stations other than the first station until after the duration indicated in the CTS frame has passed.

According to another exemplary embodiment of the present invention, an algorithm ("Algorithm P") provides a method of detecting the transmission of a first frame of a media stream, and identifying a frame that is transmitted without back-off. The identified frame is then used as a reference for scheduling invitation windows for subsequent frames without any collision.

In another embodiment, an algorithm (Algorithm Q) determines whether there are frames queued at an endpoint, particularly in a situation when the signaling traffic is encrypted for security.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present disclosure is illustrated by way of example and not limitation in the accompanying figures in which like reference numerals indicate similar elements and in which.

DETAILED DESCRIPTION OF THE PRESENTLY PREFERRED EMBODIMENTS

The invention disclosure relates to a method for providing priority access to 802.11 endpoints using the 802.11 DCF protocol. The exemplary embodiments of the present invention can be used to provide preferential channel access to non-802.11e endpoints in legacy networks (i.e., 802.11 networks that only have non-802.11e equipment) or hybrid networks (i.e., 802.11 networks that have both 802.11e and non-802.11e equipment). Hence, the method provides priority wireless channel access to emergency calls sent from non-802.11 e equipment in a hybrid wireless network, enabling compliance with proposed governmental and regulatory requirements for preferential treatment for prioritized calls without complete restructuring of the existing legacy networks.

To simplify the discussion of the exemplary embodiments, the following notations as summarized in Table I are used throughout the discussion.

TABLE I

DEFINITIONS AND NOTATIONS

| | |
|---|---|
| RTS | Request to Send |
| CTS | Clear to Send |
| DIFS | DCF interframe space |
| PIFS | Point (coordination function) interframe space |
| SIFS | Short interframe space |
| $t_{slot}$ | Slot time |
| $T_{CTS}$ | Duration of a CTS frame |
| $T_O$ | Packetization interval |

TABLE I-continued

DEFINITIONS AND NOTATIONS

| | |
|---|---|
| CW | Contention window size |
| CWmin | Minimum contention window size |
| w | Invitation window |
| $\omega$ | Range of jitter in $T_O$ |

In a DCF access process when a station A wants to transmit, it waits for DIFS and senses the medium to be idle before sending a frame. However, if station A wants to start transmitting while the channel is busy, the station enters a contention phase for the medium. Contention is done by choosing an integer random back-off between 0 and a parameter CW which is initially set to $CW_{min}$. The random back-off determines the number of time slots the station defers its transmission in addition to the DIFS time. If the medium is sensed idle in such a slot, the back-off timer is decreased by one. Once the random back-off has decreased to 0, the station starts transmitting.

Preferential channel access to non-802.11e endpoints is provided by synchronization with the media stream with or without signaling information and estimation of frame inter-arrival time. Specifically, a CTS frame sent by an AP is used to provide a transmission opportunity (in a quiet window) for a station A that is a non-802.11e endpoint.

In the event station A does not initiate a RTS, the reception of the CTS addressed at station A will be an unexpected occurrence. As such, a CTS would usually be received as an immediate response to a RTS sent by station A. Normally, if a station had sent an RTS, it would begin its transmission after receiving the CTS and waiting for a short interframe space (SIFS) time. Since station A does not send an RTS, it continues to access the channel in normal contention mode and might go into back-off. However, if the duration indicated in the CTS is greater than or equal to DIFS plus the time needed for contention, station A can send out a frame as all other stations will not access the medium during this period.

Figure 3:
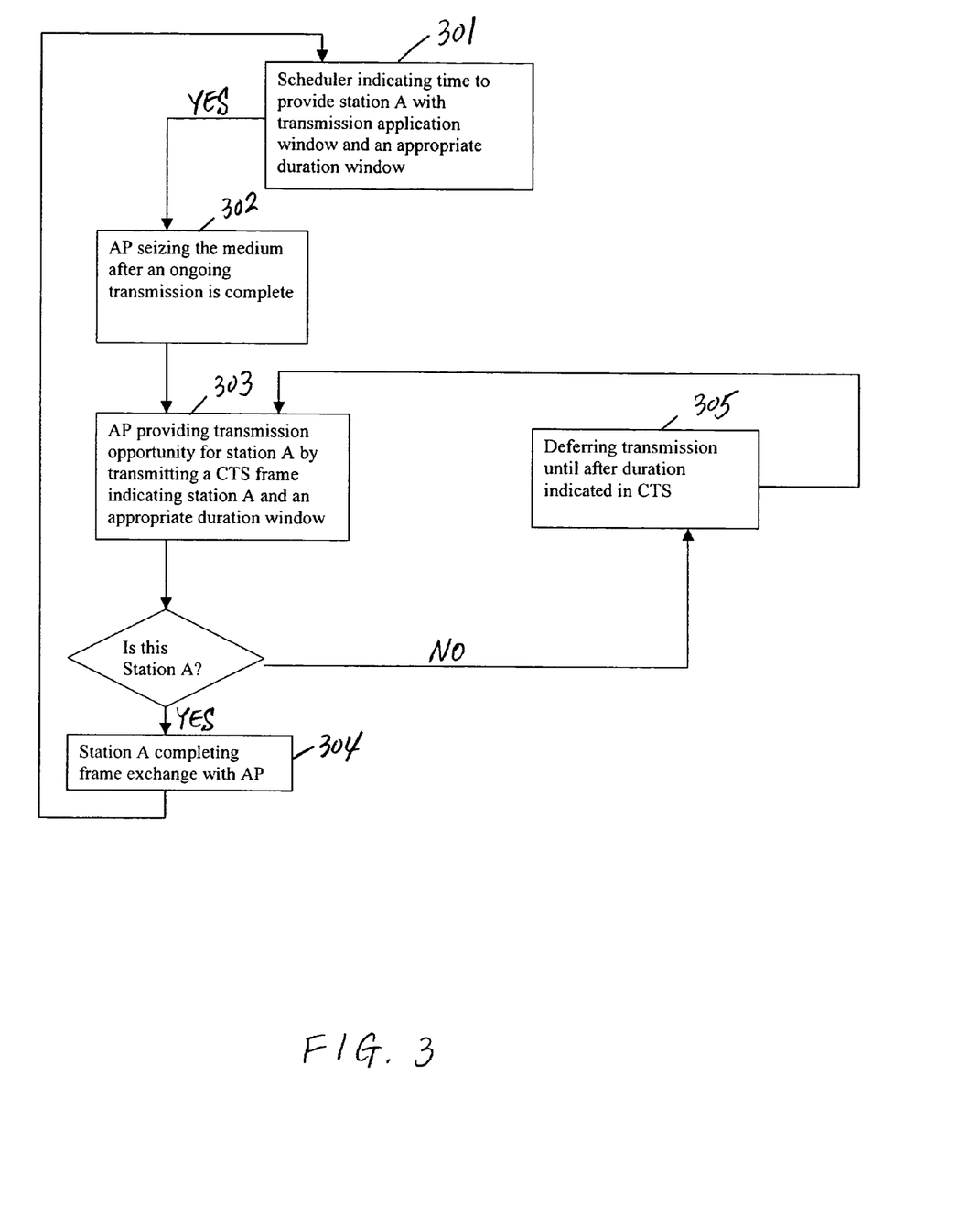
FIG. 3 illustrates a flow diagram for a CTS-Assisted Transmission Scheme ("CATS") for Multimedia Extension over wireless infrastructure.

FIG. 3 illustrates a process flow diagram for a CTS-Assisted Transmission Scheme for Multimedia Extension over wireless infrastructure in accordance with a preferred embodiment of the invention. Step 301 shows a scheduler which indicates to an access point (AP) a time and duration window of a transmission for station A. As illustrated at step 302, the AP seizes the transmission medium after an ongoing transmission is completed. At step 303, the AP provides a transmission opportunity for station A by transmitting a CTS frame indicating the duration window. At this time, station A will begin to transmit and complete frame exchange with the AP as shown in step 304, whereas stations associated with this AP other than station A will defer all transmissions until after the duration window indicated in the CTS as shown in step 305.

In VoIP, endpoints transmit RTP frames at regular intervals known as the packetization interval, $T_O$, also referred to below as inter-arrival time. By transmitting a CTS directed at a station A, station A is being invited by the AP to transmit. In an ideal situation, if the AP knows exactly when station A will transmit, the transmit duration field or "invitation window" (w) can be as small as DIFS. However, in practice, two factors complicate the situation: (i) an endpoint at station A could be in back-off due to the medium being busy at the transmit ready instant, and (ii) there is some jitter in the generation of the frame that has to be taken into account. Hence, the duration field is set to $$w=(DIFS+\omega+CW_{min} \cdot t_{slot} \cdot I(busy)), \quad (1)$$

wherein ω is the range of the symmetric jitter in $T_0$, and/(busy) is an indicator function that is 1 if the medium is busy at the scheduled beginning of an invitation window and 0 otherwise. If station A becomes ready to transmit within this window, it will transmit the frame after waiting an interval of DIFS. The next invitation to station A is scheduled at a time $T_0$ into the future. If the AP at station A is able to transmit the invitation CTS at the scheduled time, the sequence described above repeats. Even if this is delayed by an ongoing transmission, the AP is able to grab the medium after the current transmission (due to its use of PIFS interframe spacing) and the choice of the window size ensures that the endpoint will start frame transmission within the window.

A. Synchronization Algorithm P

Figure 4:
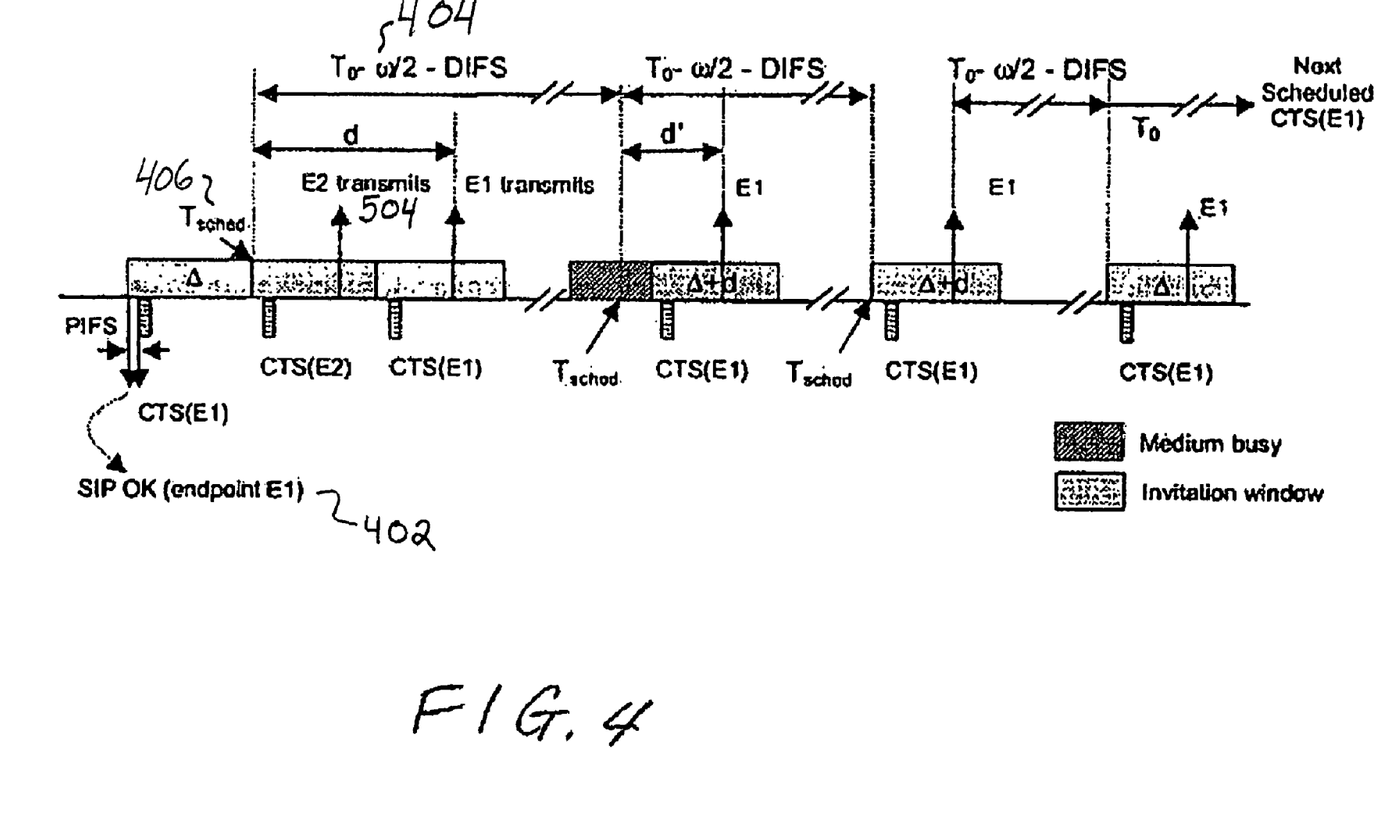
FIG. 4 illustrates a start-up sequence diagram of an algorithm in accordance with the present invention.

The method for providing preferential channel access to non-802.11e endpoints detects the transmission of a first frame of a media stream. For example, when using Session Initiation Protocol (SIP), the first frame is identified as the frame occurring immediately after a frame indicating the successful completion of call setup (e.g., the "SIP OK" 402). This detection is performed via an algorithm ("Algorithm P") as illustrated in FIG. 4.

Figure 5:
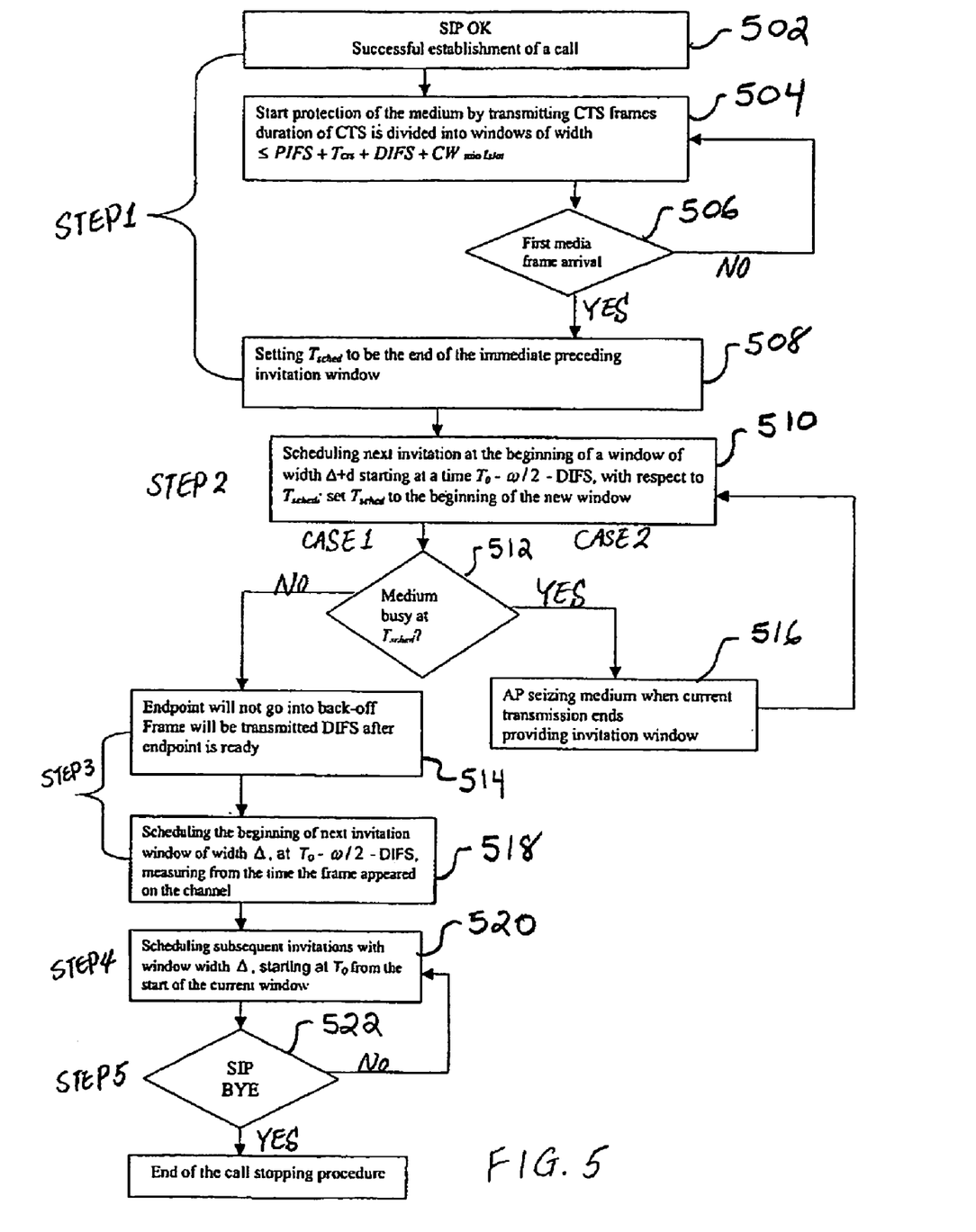
FIG. 5 illustrates a flow diagram of the steps in which algorithm P functions.

Algorithm P identifies a frame that is transmitted without back-off and uses that frame as a reference for scheduling invitation windows w for subsequent frames without any collision. In one embodiment, the formula $\Delta=PIFS+T_{CTS}+w$ is used to denote the width of the invitation window in the steady state, including the time to transmit the CTS frame. Note that the duration field of the CTS excludes PIFS and $T_{CTS}$. Referring now to FIGS. 4 and 5, Algorithm P functions as follows:

Step 1 As soon as a SIP OK to an endpoint is observed (502), signaling the successful completion of call establishment, start protecting the medium by transmitting CTS frames to that endpoint 504. The duration of the CTS is set to cover the free periods between already scheduled invitations to other voice terminals and is divided into windows of width $\leq PIFS+T_{cts}+DIFS+CW_{min} \cdot t_{slot}$. Continue this protection until the first media frame from the endpoint is observed (506). Set $T_{sched}$ to be the end of the immediately preceding invitation window for the endpoint in question (508).

Step 2 Schedule the next invitation at the beginning of a window of width $\Delta+d$ starting at a time $T_0-\omega/2-DIFS$ (404) into the future with respect to $T_{sched}$, (406) where d is the interval between $T_{sched}$ and the time the frame appeared on the medium. Set $T_{sched}$ to the beginning of this new scheduled window (510).

Step 3 case 1: If the medium is not busy (512) at $T_{sched}$, the endpoint will not go into back-off, and the frame will be transmitted DIFS after it becomes ready (514). In this case, schedule the beginning of the next invitation window, of width $\Delta$, at $T_0-\omega/2-DIFS$ into the future, measuring from the time the frame appeared on the channel (518). Continue to step 4. case 2: If the medium is busy (512), the endpoint may have gone into back-off. The AP will grab the medium when the current transmission ends and provide the invitation window (516). Continue the procedure at step 2.

Step 4 Schedule subsequent invitations with window width $\Delta$ starting at $T_0$ from the start of the current window (520). This is called the steady state.

Step 5 The procedure is stopped when a SIP BYE is observed, indicating the end of the call (522).

FIG. 5 illustrates the steps 1 through 5 described above.

In the steady state, the quiet window for a given endpoint will either straddle the transmit-ready instant or it will provide a full (CW min·$t_{slot}$+DIFS) time for any back-off countdown to complete. The endpoint will be in back-off only if the medium is busy with another transmission at the transmit-ready instant. The endpoint would go into back-off after successfully transmitting a data frame. The indicator function/(busy) could be suitably redefined to account for this condition.

Step 1 could put non-CATS traffic at a disadvantage as it essentially suppresses it until the first VoIP transmission occurs. This may not be serious since this happens only once per call. However, once the first frame is transmitted, it guarantees bounded-delay transmission as long as the jitter assumption holds. If the jitter assumption does not hold, the bounded delay will still typically be within the bound with some probability. The magnitude of this probability depends on ω.

The above described Algorithm P can be easily adapted to also account for missing frames. The basic idea is to avoid straying from the original schedule when frames are missed.

B. Synchronization Algorithm Q

Algorithm P makes the assumption that a network element, for example, an AP that is not an endpoint of a call, can view the signaling frames. This assumption is not valid in some cases, for example, when the signaling traffic is encrypted for security, as discussed in J. Rosenberg, H. Schulzrinne, G. Camarillo, A. Johnston, J. Peterson, R. Sparks, M. Handley, and E. Schooler, "SIP: Session Initiation Protocol," IETF RFC 3261, June 2002. In this case, when a call is an emergency call, the flow information identifying it as such will have to be provided by the signaling server. The possible delay in obtaining emergency-identifying information may cause frames to be queued at the endpoint. A below-described algorithm (Algorithm Q) has been devised to address this problem.

Once the start of an emergency call from an endpoint is signaled by the server, Algorithm Q enables the AP to reserve the transmission medium channel by transmitting CTS frames to the call orignating endpoint. The duration of the CTS is set to cover the free periods between already scheduled invitations (w) to other voice terminals as described in Algorithm P. After the first CTS frame transmission, the AP continues to issue subsequent invitations. If a frame transmission is observed during the invitation window immediately following the first CTS frame, it could either be due to a) the invitation window having straddled the transmit ready instant or b) a frame waiting in the buffer at the endpoint. Continue this protection until another frame transmission is observed after or at least one invitation window during which no transmission takes place (should be within a window with of $T_0+\omega$ from the last transmission). At this point, Algorithm Q has ensured that the queue at the endpoint is empty, and continues with Step 2 of Algorithm P.

In the discussion above, for the purpose of simplicity, it has been assumed that $T_0$ is known. In practice, however, the value of $T_0$ must be estimated in order to improve accuracy of the performance of algorithm P and Q. For algorithm P, $T_0$ can be obtained by observing the call establishment signaling. For algorithm Q, however, $T_0$ cannot be obtained from the encrypted frames and hence should be provided by some other means, such as by the signaling server or by local estimation. In addition, the actual value of the interval may vary from frame to frame and is the source of the jitter. A measure of this variation is specified by ω. Estimating frame inter-arrival time may also be needed if significant clock drift is anticipated. Technologies for estimating $T_0$ are set forth below.

C. Estimating Frame Inter-Arrival Time

If the packetization interval (or frame inter-arrival time $T_0$) is known, the AP can estimate the i+1th arrival time, $t_{i+1}$ to be $(t_i+T_0)$ms. This is called the fixed algorithm. The descriptions of algorithms P and Q earlier used this method.

If the packetization interval is not known a priori, several other heuristics could be used. Three simple heuristics are provided below as examples:

The mart (martingale) heuristic, where the ith inter-arrival time is estimated to be equal to the i-1th inter-arrival time. Detailed discussion of martingales can be found in W. Feller, An Introduction to Probability Theory and its Applications, Volume 2, John Wiley and Sons.

The wavgeo (geometric weighted average) heuristic where the Ah inter-arrival time is estimated to be an exponentially weighted sum of the last k inter-arrival times, and The wavuni (uniform weighted average) heuristic, where the ith inter-arrival time is estimated to be the average of the last k inter-arrival times.

Notice that for the mart technique, one inter-arrival time is needed before starting to make predictions and for the wavgeo and wavuni techniques, k inter-arrival times are needed. For the wavgeo and wavuni techniques, the mart technique or an estimated $T_0$ can be used until there are enough inter-arrival times for prediction.

In the description of the methods discussed above, SIP is used as the signaling protocol. It should be noted that the algorithms will operate the same for other signaling protocols as well.

D. Experiments, Observations and Results

1. Experimental Study

The present invention was tested using trace-driven simulations with actual VoIP time-stamped sequences. The inventors obtained accurate time stamps of when VoIP frames were received at the network interface card (NIC) of the machine on which the frames were generated. Fourteen traces of frames were obtained, where each trace consisted of approximately 50 frames that were generated nominally 20 ms apart. The characteristics of the trace data are shown in Table II where it was observed that although the frames were expected to be generated and arrive at the NIC with a packetization interval $T_0=20$ ms, in practice, the frame inter-arrival time was not exactly 20 ms. This can be due to normal system variations stemming from the endpoint state (e.g., the processes running on the end-terminal, the clock drift, its interrupt status, etc.). Therefore, $T_0$ is a random variable that depends on the system state. This suggests that the technique for estimating when a frame will be ready at the protected terminal is important. The objective of the experiments was to understand the effect of the variability of $T_0$ and the chosen prediction technique on CATS.

TABLE II

CHARACTERISTICS OF THE VoIP TRACE DATA

| | |
|---|---|
| Number of traces | 14 |
| Number of frames per trace | 48-50 |
| Nominal packetization interval, $T_O$ | 20 ms |
| Range of average inter-arrival times | 19.98-20.85 ms |
| Range of std. Dev. of inter-arrival times | 0.04-7.03 ms |

TABLE II-continued

CHARACTERISTICS OF THE VoIP TRACE DATA

| | |
|---|---|
| Average inter-arrival time (all traces together) | 20.2 ms |
| Std. dev. of inter-arrival time (all traces together) | 3.33 ms |

The inventors compared the four inter-arrival prediction techniques described in Section C estimating frame inter-arrival time. In the experiments reported here, the inventors used k=4, and for the first 4 predictions, assumed $T_0=20$ ms. The inventors then computed three metrics for each of the 14 traces, and also the cumulative value over all 14 traces:

the goodness, g, which is defined as follows. Given a jitter window, ω, g(ω) is defined to be the percentage of frames that fall within the interval (−ω/2, ω/2) of the predicted arrival time. In other words, g(ω) is a measure of the number of frames whose arrival is correctly predicted, and hence can be protected by the AP.

the average error, ε, defined as the average amount by which the actual arrival time deviates from the predicted arrival time.

the lost frames, l, defined as the percentage of frames lost, i.e., delayed by more than 5 ms from generation to the reception at the NIC.

TABLE III

| Metric | Fixed | Mart | Wavuni | wavgeo |
|---|---|---|---|---|
| Range of g (%) | 91.8-100 | 85.7-100 | 87.7-100 | 85.7-100 |
| Mean of g (%) | 97.6 | 96.6 | 97.2 | 97.0 |
| Range of ε (μs) | 25.4-139.8 | 39.7-267.5 | 30.3-183.8 | 33.3-208.4 |
| Mean of ε (μs) | 58.7 | 105.4 | 70.5 | 81.2 |
| Range of l (%) | 0-4.1 | 0-4.1 | 0-4.1 | 0-4.1 |
| Mean of l (%) | 0.73 | 0.73 | 0.73 | 0.73 |

In Table III, the inventors present the goodness, average error and lost frames results for the various prediction strategies for the VoIP traces. The range reported above is across the 14 traces, and the mean is over all 14 traces. For all techniques very few frames are lost. The fixed technique performs better than the other techniques with regards to the reported metrics. This result suggests that the knowledge of the packetization interval helps. It also suggests that the variations in inter-arrival times in practice are not very significant and are counter-acted by the jitter window ω. The inventors also observe that the difference between the techniques vis a vis goodness is not significant, but the delay metric does vary among the techniques. Amongst the techniques without a known packetization interval, wavuni seems to perform best. It is also computationally simpler, and could potentially be adapted to different packetization intervals making it a good approach to use.

Figure 6:
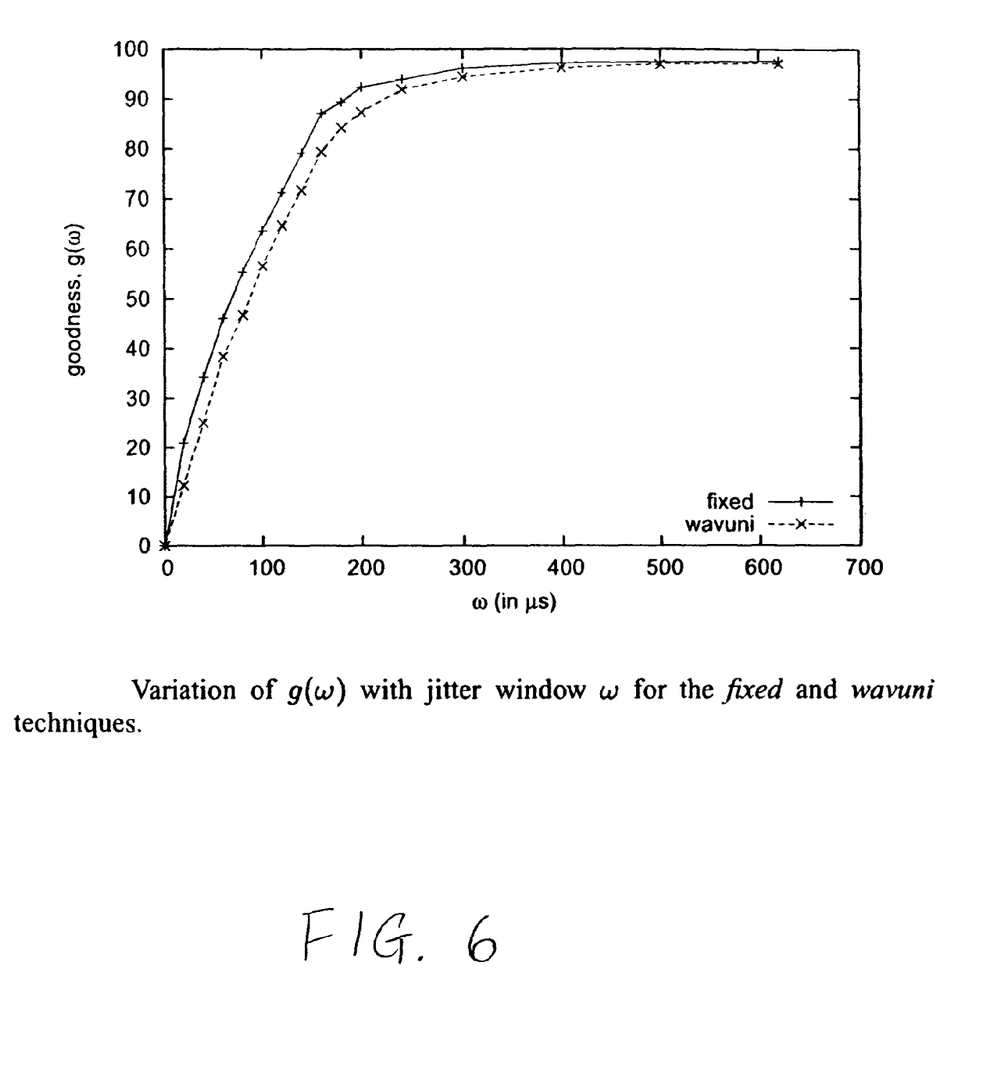
FIG. 6 illustrates a variation of goodness as a function of the jitter window "g($\omega$)" with jitter window $\omega$ for "fixed" and "wavuni" frame arrival time measurement techniques.

To understand the dependence of goodness on the jitter window size ω, variation of g(ω) as a function of ω for the fixed and wavuni techniques were studied. As seen from FIG. 6, for both techniques, g(ω) drops with decreasing ω, with fixed performing better than wavuni. (That fixed will do better than wavuni in this respect is suggested by the lower ε value for fixed in Table III.). The experiments also revealed that if only a large percentage of the frames (e.g., 95% of the frames) are to be protected, then ω≦300 μs for fixed, and ω≦400 μs for wavuni can be used. Such protection may be acceptable, since most packet loss concealment algorithms can work adequately with approximately 5% frame loss.

These experimental results show that CATS is capable of providing preferential access to legacy endpoints in hybrid environments successfully.

2. Efficiency Considerations

The inventors performed a simplified analytical study of the efficiency of CATS. This analysis showed that CATS has more overhead than DCF. The overhead for CATS increases with an increasingly busy channel. The inventors made two observations.

a) DCF operation provides no delay guarantees, whereas CATS provides bounded delay access for almost all frames.

b) The call capacity with CATS support for a small number of terminals is not significantly degraded compared to pure DCF operation. For example, in the case of 802.11 b DCF operation with G.711-coded voice with a packetization interval of 20 ms, the channel capacity has been shown through simulations and experiment to be about 12 calls, i.e. 24 half-duplex connections. When protecting 2 calls with CATS (i.e., 4 half-duplex connections), calculations show that the total capacity is ≈11 calls (i.e., 22 half-duplex connections). In other words, the presence of a small number of CATS-protected terminals does not result in a significant reduction of the overall capacity of the channel.

E. Implementation Considerations

In the analysis discussed in section D, the experimental results show that very few frames, if any, are lost and hence this should not be an issue in practice (the loss referred to here is between generation of the frame in user space and its reception at the NIC, all within the endpoint). However, it is noted that in some implementations, the frames may remain in the queue for longer than the packetization interval leading to blocking of the transmission channel. This can be avoided in several ways, e.g., the endpoint discards frames delayed by more than a packetization interval. Such a strategy is reasonable in real time applications since excessively delayed frames will be discarded by the receiver anyway.

The above description provides a method of providing an AP-based overlay using the 802.11 DCF to provide priority access to non-802.11e endpoints without requiring any client changes using the CTS-assisted transmission scheme (CATS) technique. This method can also be deployed to give priority access to VoIP calls originating from 802.11e/non-802.11e hybrid networks. The trace-driven experimental validation of CATS indicates that this technique is well suited to provide adequate protection for real-time traffic, in particular for emergency VoIP calls. An analysis showed that the use of CATS protection for a small number of endpoints does not have significant impact on the overall channel capacity of a wireless network.

Although the above discussion is based on an Access Point based overlay because the contention function is typically implemented via Access Points, it will be recognized by those of ordinary skill that the embodiments of the present invention do not preclude the use of designated endpoints to perform necessary overlay functions as discussed above. Therefore, in this disclosure, the description of "Access Point based overlay" is solely for the purpose of clarity and simplicity.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing priority access to 802.11 endpoints comprising the steps of:

sending an unsolicited Clear To Send (CTS) frame from a designated station without requiring a Request to Send (RTS) frame from a first station, said CTS frame including a field identifying said first station for commencing transmission, and a field indicating a duration; and deferring any transmissions of stations other than said first station until after said duration indicated in said CTS frame has passed, wherein the sending and deferring occur during a contention period wherein said duration is set to:

$$w = (DIFS + \omega + CW_{min} \cdot t_{slot} \cdot I(\text{busy}))$$

wherein $\omega$ is the range of symmetric jitter in $T_0$;

I(busy) is an indicator function that is 1 if the medium is busy at the scheduled beginning of an invitation window and 0 otherwise;

w is an invitation window;

DIFS is a DCF interframe space;

$CW_{min}$ is a minimum contention window size; and $t_{slot}$ is a slot time and t zero is a first packetization interval.

2. The method as recited in claim 1, wherein said designated station is an access point (AP).

3. The method as recited in claim 2, further comprising the steps of:

seizing wireless medium by said AP; and transmitting a frame after said wireless medium has been idle for a Point Interframe Space (PIFS) using Coordination Function between said first station and said designated station.

4. The method as recited in claim 3, wherein the step of seizing wireless medium further comprises the step of the period indicated in said field indicating a duration, said designated station providing a transmission opportunity for said first station after conclusion of any ongoing frame exchange sequence on said wireless medium.

5. The method as recited in claim 1, wherein said first station includes a voice over internet protocol (VoIP) endpoint transmitting frames at regular packetization intervals, $T_0$.

6. The method as recited in claim 1, further including a step of setting minimum contention window size (CWmin) to a low value.

7. The method as recited in claim 1, wherein said first station includes a voice over internet protocol (VoIP) endpoint transmitting frames at regular packetization intervals, $T_0$.

8. The method as recited in claim 7, further comprising the steps of:
estimating $T_0$ at a signaling server; and
estimating a frame inter-arrival time.

9. The method as recited in claim 8, wherein the step of estimating said frame inter-arrival time further comprises using a mart (martingale) heuristic.

10. The method as recited in claim 8, wherein the step of estimating frame inter-arrival time comprises using a wavgeo (geometric weighted average) heuristic.

11. The method as recited in claim 8, wherein the step of estimating frame inter-arrival time comprises using the wavuni (uniform weighted average) heuristic.

12. A method for providing priority access to 802.11 endpoints comprising the steps of:
sending an unsolicited Clear To Send (CTS) frame from a designated station without requiring a Request to Send (RTS) frame from a first station, said CTS frame including a field identifying said first station for commencing transmission, and a field indicating a duration;
deferring any transmissions of stations other than said first station until after said duration indicated in said CTS frame has passed, wherein the sending and deferring occur during a contention period; and
inviting said first station to transmit by transmitting a Clear to Send (CTS) directed to said first station at a time immediately prior to an invitation window that is before said first station has gone into a back-off mode,
wherein said invitation window w is set to:

$$w = (DIFS + \omega + CW_{min} \cdot t_{slot} \cdot I(busy))$$

wherein $\omega$ is the range of symmetric jitter in $T_0$;
I (busy) is an indicator function that is 1 if the medium is busy at the scheduled beginning of an invitation window and 0 otherwise;
w is an invitation window;
DIFS is a DCF interframe space;
$CW_{min}$ is a minimum contention window size; and
$t_{slot}$ is a slot time and t zero is a first packetization interval.

13. The method as recited in claim 1, wherein said CTS frame of said identified station identifies an emergency call.

14. The method as recited in claim 12, wherein said invitation window w is as small as a DCF Interframe Space (DIFS).

15. The method as recited in claim 5, further comprising the steps of:
transmitting a frame from said VoIP endpoint after waiting an interval period of DIFS; and
scheduling next invitation to said VoIP endpoint to a future time $T_0$ that is a packetization interval.

16. The method as recited in claim 15, wherein said designated station is able to transmit an invitation CTS at said scheduled future time $T_0$.

17. The method as recited in claim 16, further comprising the step of repeating said method until all frames from said VoIP endpoints are transmitted.

18. A method for providing priority access to 802.11 endpoints comprising the steps of:
sending an unsolicited Clear To Send (CTS) frame from a designated station without requiring a Request to Send (RTS) frame from a first station, said CTS frame including a field identifying said first station for commencing transmission, and a field indicating a duration;
deferring any transmissions of stations other than said first station until after said duration indicated in said CTS frame has passed, wherein the sending and deferring occur during a contention period, wherein a signaling protocol is used to detect a first frame of a transmission;
identifying a frame that is transmitted without back-off using a synchronization algorithm P; and
using said frame as a reference for scheduling invitation windows for subsequent frames occurring after said frame without any collision, wherein said synchronization algorithm P defines the width of an invitation window in a steady state as: $\Delta = PIFS + Tcrs + w$, wherein Tcts is the time to transmit a CTS frame, wherein PIFS is a point interframe space in a coordination function and w is an invitation window.

19. The method as recited in claim 18, further comprising the steps of:
signaling a successful completion of call establishment as soon as a signaling message to an endpoint indicating successful call establishment is observed; and
starting to protect said wireless medium by transmitting CTS frames to said endpoint.

20. The method as recited in claim 19, further comprising the steps of:
setting the duration of a CTS to cover free periods between already scheduled invitations to other voice terminals, the duration of CTS being divided into windows of width $\leq PIFS + Tcrs + DIFS + CW_{mintslot}$;
continuing protection until a first media frame from an endpoint in said first station is observed; and
setting $T_{sched}$ to be the end of an immediately preceding invitation window for said endpoint in said first station.

21. The method as recited in claim 20, further comprising the steps of:
scheduling a next invitation window at the beginning of a new scheduled window of width $\Delta + d$ starting at a time $T_0 - \omega/2 - DIFS$ into a future $T_{sched}$, wherein d is the interval between said future $T_{sched}$ and the time a first media frame appeared on said wireless medium; and
setting said future $T_{sched}$ to the beginning of said new scheduled window.

22. The method as recited in claim 21, further comprising the steps of:
wherein when said medium is not busy at said future $T_{sched}$, said endpoint will not go into a back-off mode, transmitting said frame at DIFS after said wireless medium becomes ready; and
scheduling the beginning of a next invitation window of width $\Delta$, at $T_0 - \omega/2 - DIFS$ into a future time, as measured from the time said frame appeared on said wireless medium.

23. The method as recited in claim 21, further comprising the steps of:
wherein when said wireless medium is busy at said future $T_{sched}$, and if said endpoint has gone into back-off, said designated station reserving said wireless medium when a current transmission ends;
said designated station providing said new scheduled invitation window to said endpoint in said first station; and
scheduling another next invitation window at the beginning of a second new scheduled window of width $\Delta + d'$ starting at a time $T_0 - \omega/2 - DIFS$ into a second future $T_{sched}$, wherein d' is the interval between said second future $T_{sched}$ and the time another media frame appeared on said wireless medium; and setting said second future $T_{sched}$ to the beginning of said second new scheduled window.

24. The method as recited in claim 22, further comprising the steps of:

scheduling subsequent invitation windows with window width Δ at $T_0$ into the future from the start of a current window in a steady state.

25. The method as recited in claim 19, further comprising the steps of:

observing a signaling message which indicates the end of a call; and stopping the step of scheduling subsequent invitation windows.

26. The method as recited in claim 23, further comprising the steps of:

observing a signaling message which indicates the end of a call; and stopping the step of scheduling subsequent invitation windows.

27. The method as recited in claim 18, further comprising the steps of:

identifying a signaling frame indicating an emergency call sent from said VoIP endpoint in a signaling server;

identifying a frame transmitted without back-off and using said frame as a reference to schedule invitation windows for subsequent frames without any collision; and protecting said medium by transmitting CTS frames to said VoIP endpoint.

* * * * *